(12) United States Patent
Pawlik et al.

(10) Patent No.: US 8,653,445 B2
(45) Date of Patent: Feb. 18, 2014

(54) METHOD FOR VIEWING INVISIBLE INDICIA

(75) Inventors: Thomas D. Pawlik, Rochester, NY (US); Thomas J. Widzinski, Rochester, NY (US); Judith A. Bose, Webster, NY (US); Myra T. Olm, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 217 days.

(21) Appl. No.: 13/270,273

(22) Filed: Oct. 11, 2011

(65) Prior Publication Data

US 2013/0087699 A1    Apr. 11, 2013

(51) Int. Cl.
*G06K 7/10*  (2006.01)

(52) U.S. Cl.
USPC .......................................... 250/271

(58) Field of Classification Search
USPC .......................................... 250/271
See application file for complete search history.

(56) References Cited

U.S. PATENT DOCUMENTS

| | | | |
|---|---|---|---|
| 5,093,147 A | 3/1992 | Andrus et al. | |
| 5,393,654 A | 2/1995 | Burrows et al. | |
| 5,541,054 A | 7/1996 | Miller et al. | |
| 6,184,534 B1 | 2/2001 | Stephany et al. | |
| 6,700,613 B1 | 3/2004 | Bryant et al. | |
| 7,174,400 B2 | 2/2007 | Horowitz et al. | |
| 7,357,326 B2 | 4/2008 | Hattersley | |
| 7,516,899 B2 | 4/2009 | Laser | |
| 7,529,385 B2 * | 5/2009 | Lawandy et al. | 382/100 |
| 7,712,667 B2 | 5/2010 | Laser | |
| 8,336,780 B1 * | 12/2012 | Spitz | 235/470 |
| 2007/0119949 A1 | 5/2007 | Hattersley et al. | |
| 2007/0272756 A1 | 11/2007 | Brock et al. | |

FOREIGN PATENT DOCUMENTS

| | | |
|---|---|---|
| EP | 0147257 | 7/1985 |
| EP | 0 468 465 | 1/1992 |
| EP | 0 636 493 | 2/1995 |
| EP | 0 841 189 | 5/1998 |
| EP | 1 147 886 | 10/2001 |
| EP | 1 191 526 | 3/2002 |
| EP | 1 759 836 | 3/2007 |
| JP | 2008-088426 | 4/2008 |
| JP | 2010-241873 | 10/2010 |
| JP | 2011-016879 | 1/2011 |
| WO | 95/07822 | 3/1995 |
| WO | 02/16515 | 2/2002 |

\* cited by examiner

*Primary Examiner* — David Porta
*Assistant Examiner* — Hugh H Maupin
(74) *Attorney, Agent, or Firm* — Nelson Adrian Bush (57) ABSTRACT

A method for detecting and viewing invisible indicia includes illuminating the invisible indicia with radiation of a first wavelength with an illumination source; detecting emitted light from the invisible indicia at a second wavelength with a sensor array; eliminating reflected radiation at the first wavelength; focusing an image of the invisible indicia on the sensor array; displaying the image of the invisible indicia; spacing the sensor array at a fixed distance from the invisible indicia with a spacer; and adjusting sensitivity of the sensor array.

14 Claims, 7 Drawing Sheets

METHOD FOR VIEWING INVISIBLE INDICIA

CROSS REFERENCE TO RELATED APPLICATIONS

Reference is made to commonly-assigned U.S. patent application Ser. No. 13/270,269 (now U.S. Publication No. 2013/0089713), filed Oct. 11, 2011, entitled ARTICLE PRINTED WITH INFRARED DYE, by Widzinski et al.; and U.S. patent application Ser. No. 13/270,260 (now U.S. Publication No. 2013/0088603), filed Oct. 11, 2011, entitled COMPACT VIEWER FOR INVISIBLE INDICIA; the disclosures of which are incorporated herein.

FIELD OF THE INVENTION

This invention relates in general to security markers and in particular to security markers with adjustable sensor sensitivity control.

BACKGROUND OF THE INVENTION

Inks have been used to mark items for a number of purposes, for example, for determining their authenticity or unique identification. Such markings, e.g., covert markings, may be used to identify goods that are intended for sale in a particular market. These markings are intended to prevent profit through the selling of goods for higher margins in a higher value market, where such goods were originally distributed for sale in a lower value market.

Covert marking applications typically require that the markings are both invisible to the human eye and difficult to reproduce in the event that the marking is discovered. Such marks can be produced through careful application of dyes that exhibit useful Stokes shifts when excited with a particular wavelength of light. UV dyes, for example, when excited with UV light will often emit a human detectable emission in the visible region.

Many lower cost materials that exhibit this phenomenon emit light in the blue region. This phenomenon may be useful, but has some serious drawbacks. Primarily, the ability to detect "UV marks" is quite easy because you only need a source of UV light (ubiquitous these days) and your eye, thus rendering the security of these marks as questionable. Secondarily, the effectiveness of blue emitting materials is limited, sometimes severely so if the substrate is white and has been treated with optical brighteners. Substrates treated with optical brighteners also emit blue light when excited with UV light thus making the contrast between substrate and mark difficult if not impossible to determine.

Infrared (IR) dyes have the benefit of excitation and emission in the infrared region. Without the aid of a carefully constructed viewing device, IR emission is not detectible to the human eye. A major drawback of these systems is that by their nature IR dyes are not particularly lightfast. Many efforts have been made to improve dye stability through dye structure manipulation and through favorable formulation development, i.e., inclusion of stabilization addenda.

It is known that inks for printing generally include a vehicle or solvent, a colorant (dye or pigment), a binder material (that affixes the colorant in place once the vehicle is adsorbed or evaporates) and other addenda that are specific to the printing methodology in use. In the case of solvent-based continuous inkjet printing, the vehicle may be a combination of organic solvents, the colorant (a dye or pigment depending on the equipment design and substrate requirements), a binder material (generally a polymer having sufficient solubility, viscosity, solvent release and binding properties), and conductivity improver (to enable sufficient charging of discrete ink droplets) and other addenda that enhance overall ink performance.

Polymethine (cyanine) dyes are one class of several possible classes that are nicely soluble in a variety of continuous inkjet printing systems and exhibit good fluorescence quantum yield. However most IR dyes, including polymethine dyes, are susceptible to undesired reactions leading to their possible depletion before an inks' desired lifetime has expired.

IR dyes are generally dark green to black when dissolved in solvent. It is a requirement that the dye be invisible to the eye when printed in the form of an ink (low or no stain). When printed, IR dyes can be visualized in an absorptive or emissive mode. Greater selectivity, and thus security, is enjoyed when the dyes are visualized in the emissive mode. This necessitates that the viewing device be constructed such that the excitation and emission wavelengths be sufficiently separated so that only the dye emission is detected and displayed. An additional requirement is that the dye be sufficiently diluted such that self quenching does not inhibit the emission process.

U.S. Pat. No. 5,093,147 discloses infrared fluorescing inks which are useful for printing invisible markings on the surface of an article. The inks use known polymethine (cyanine) laser dyes. Although the dyes used provide invisible markings, the cyanine dyes, unfortunately, have the disadvantage of fading or decomposing upon brief exposure to ultraviolet light.

It is known that near IR emissive dyes are susceptible to decomposition and that structural variation of the dye itself as well as the inclusion of protective addenda may lead to improved results. Said improvements are expensive and research intensive and do not completely eliminate dye fade. An apparative solution to mitigate the effects of dye fade through the design of the viewer is therefore desirable.

U.S. Pat. Nos. 7,712,667 and 7,516,899 disclose a hand held wireless reading viewer of invisible barcodes. It includes a display offering a live preview of the camera image. The intended function of this preview is only to find and center a non-human readable barcode. A microprocessor decodes the barcode and the result of the operation is the display and transfer of the barcode data.

U.S. Pat. No. 6,184,534 discloses a data reader and media bearing fluorescent indicia and the method of pulsing a light emitting diode. It is recognized that the fluorescent intensity of the dyes can be variable and it is suggested to pulse the light source with a current that is significantly higher than the steady state rated current in order to increase the amount of excitation light. The data reader is intended for decoding machine readable codes. It is shown positioned at a distance from the item with the fluorescent indicia with a substantial area of free space between the reader and the indicia. This allows ambient light to interfere with the signal from the fluorescent indicia.

U.S. Pat. No. 6,700,613 discloses a camera system for capturing both a visible and an invisible image. Like U.S. Pat. No. 6,184,534 the camera system is shown at a variable distance from the object without a means of excluding ambient light.

U.S. Pat. No. 7,357,326 discloses a fluorescent or luminescent optical symbol scanner intended for decoding a machine readable code. Exclusion of stray ambient light is important. This disclosure includes a shroud as part of the scanner. In order to realize the benefit of the shroud, however, the operator has to force the scanner onto the marked item.

U.S. Pat. No. 7,174,400 discloses thermal printing ribbons marked with an infrared fluorescent compound. For visualization of the markings, a hand held device is proposed where a camera is mounted inside a box above an opening at the bottom. Laser diodes are used to illuminate the sample and the image is viewed on a swivel monitor on top of the box.

None of the prior art recognizes that fading of the dye image is unavoidable and therefore additional measures are desirable to compensate for the fade of the dye using, for example, electronic means. The devices in the prior art are also commonly used to decode machine readable codes. An image preview function is only used to find the machine readable indicia, whereupon a microprocessor decodes the code. It is not recognized that human readable codes are an easier alternative in particular because they can be printed and read in a string that is wider than the field of view of the viewing device. Furthermore, the devices in the prior art are generally supported independently of the marked item, for example by holding a pistol grip-like manner, thus making it difficult to shield ambient light, in particular when the marked item lies flat.

SUMMARY OF THE INVENTION

The present invention relates to a simple lightweight viewer for the visualization of human readable invisible indicia. It is constructed such that it rests on the marked item and offers a live preview image of the invisible indicia on a display on top of the viewer. One of the resting points of the viewer also functions as a shroud to block interference from ambient light. The invisible information can be alphanumeric strings. If the string is wider than the field of view of the viewer, the user can move the devices along the path of the string while reading the information on the display. For example, a printed name or code number can thus be compared to other visible information on the item, thus offering instant authentication. The viewer also comprises an electronic circuit to amplify or attenuate the image intensity based on the brightness of the invisible indicia. This circuit thus compensates for inevitable fading of the invisible indicia.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
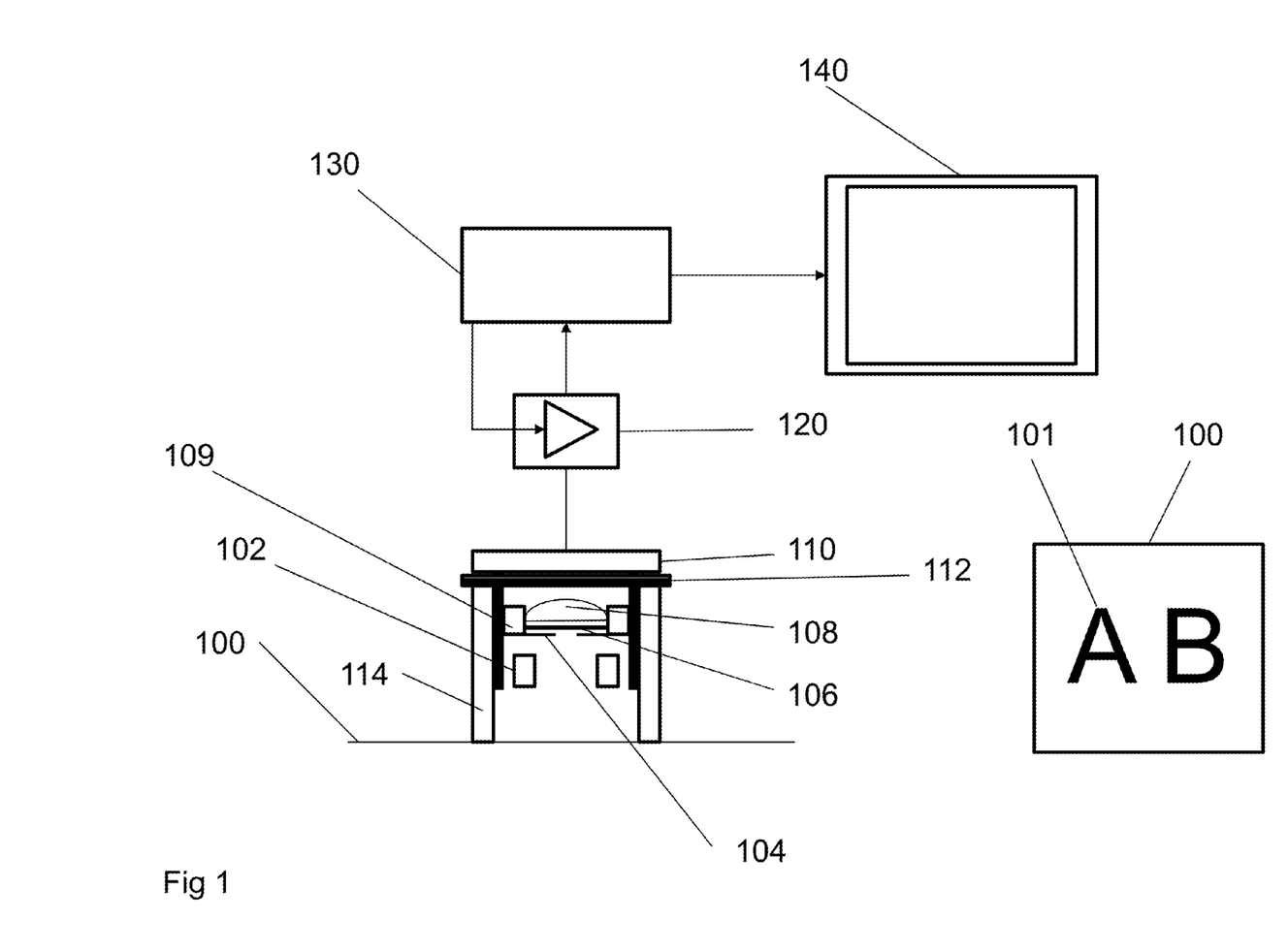
FIG. 1 is a schematic view of the components of the viewer.

Referring now to FIG. 1 which shows the principal components of an imaging viewer suitable for viewing indicia printed with invisible infrared fluorescent inks A plurality of light sources 102 illuminate the surface of the marked media 100 with radiation of wavelength $\lambda_{ex}1$. The wavelengths are chosen such that they overlap with one or more absorption bands of the fluorescent dyes that comprise the infrared fluorescent ink. Light emitting diodes or laser diodes are suitable light sources. Upon excitation at wavelengths $\lambda_{ex}1$, the fluorescent dyes emit radiation at wavelengths $\lambda_{em}1$. An imaging system comprising a circular aperture 104, filter 106, focusing lens 108, and array sensor 110 capture the image of the fluorescence of the printed indicia. The filter 106 serves to block the radiation of the light sources 100 while passing the emitted fluorescence radiation. The lens 108 focuses the fluorescence image onto the array sensor 110. The distance between the surface of the printed media and the lens can be adjusted using a focusing ring 112. A spiral grove in the focusing ring guides protrusions in a circular lens holder 109 and thereby translates the rotation of the focusing ring into a translational movement of the lens. The distance between the array sensor and the surface of the media is kept constant by way of a cylindrical baffle or spacer 114 of fixed length that surrounds the lens and light source. The baffle serves to block ambient light by way of an opaque outer surface. An inner white surface aids in diffusing the emitted radiation of the light sources. The array sensor 110 is of the CCD or CMOS type. The image is read out pixel-wise as a chain of voltages which are amplified by a variable amplifier stage 120. This amplifier can be physically integrated with the array sensor 110. The amplified image is digitized by a microcontroller 130. The digital image information is sent to a display 140 and the image is displayed at a rate that is equal to the rate of image capture. Typical values are 10-40 images/second. The microcontroller 130 analyzes each image and detects the image brightness in a region of interest. If the image brightness is larger or smaller than an expectation value, a correction signal is sent to the amplifier which adjusts the degree of amplification. For example, if the image is that of a severely faded fluorescent dye and is therefore less bright than the expectation value, the microcontroller increases the gain factor of amplifier 120 such that the next captured image is brighter. The relationship between image brightness and amplifier gain can be defined by a look up table. Alternatively, a proportional-integral-derivative (PID) control loop can be used.

Figure 2:
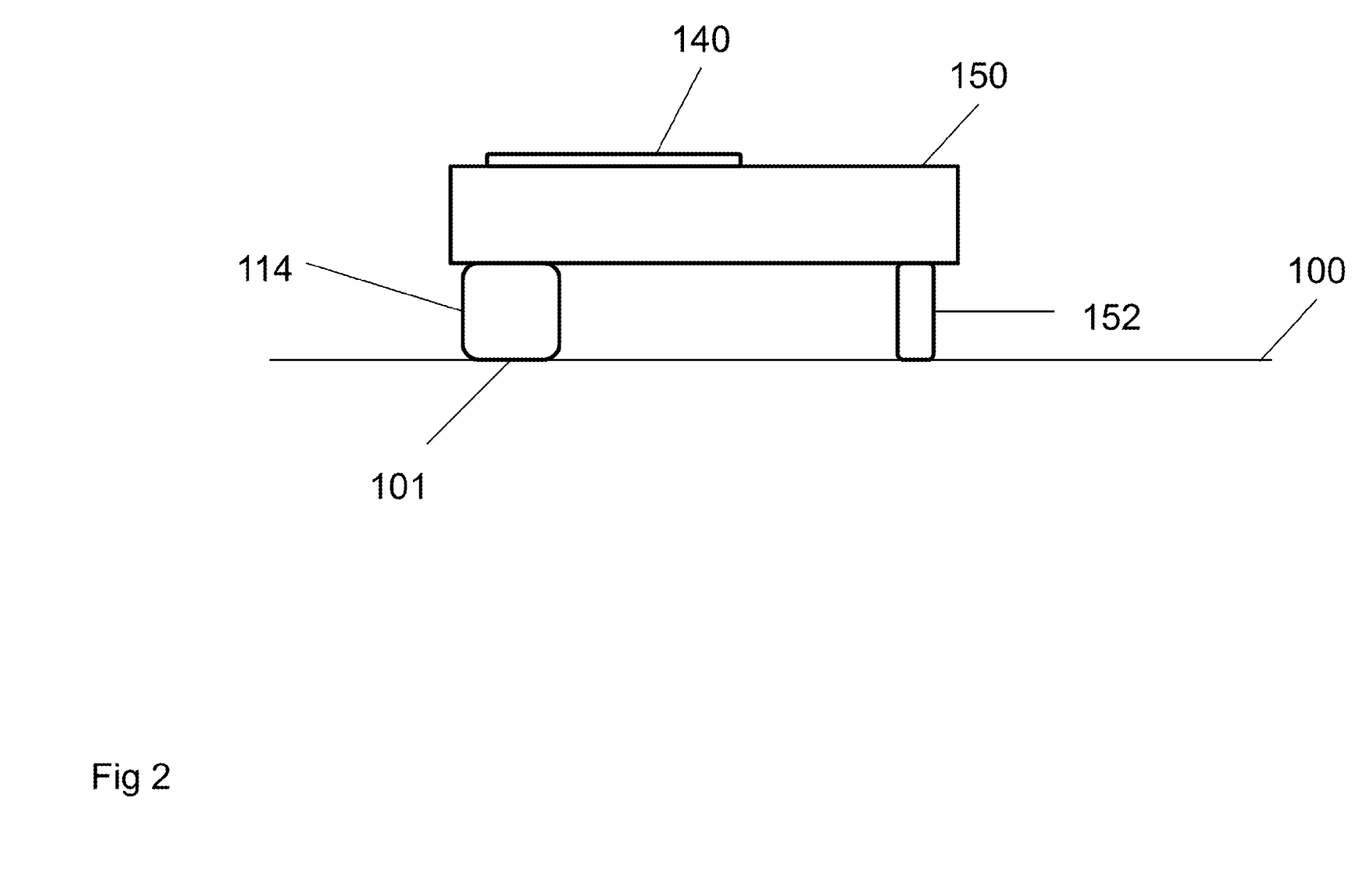
FIG. 2 is a schematic view of the viewer positioned on a marked item.

FIG. 2 shows a drawing of an imaging viewer suitable for viewing indicia printed with invisible infrared fluorescent inks For user convenience, the housing of the viewer 150 rests on the printed media 100 and is supported by the baffle 114 and feet 152. The image of the indicia printed using fluorescent inks is shown to the user on the display 140 at a position close to where the actual indicia 101 are printed on the surface of the media. If the size of the indicia is larger than the field of view of the viewer, for example when the indicia are a long string of alphanumeric characters, the user is able to drag the viewer over the region of printed indicia while simultaneously reading the information shown on the display. The viewer configuration is particularly advantaged for viewing information printed on a horizontal surface such as a document.

Figure 3:
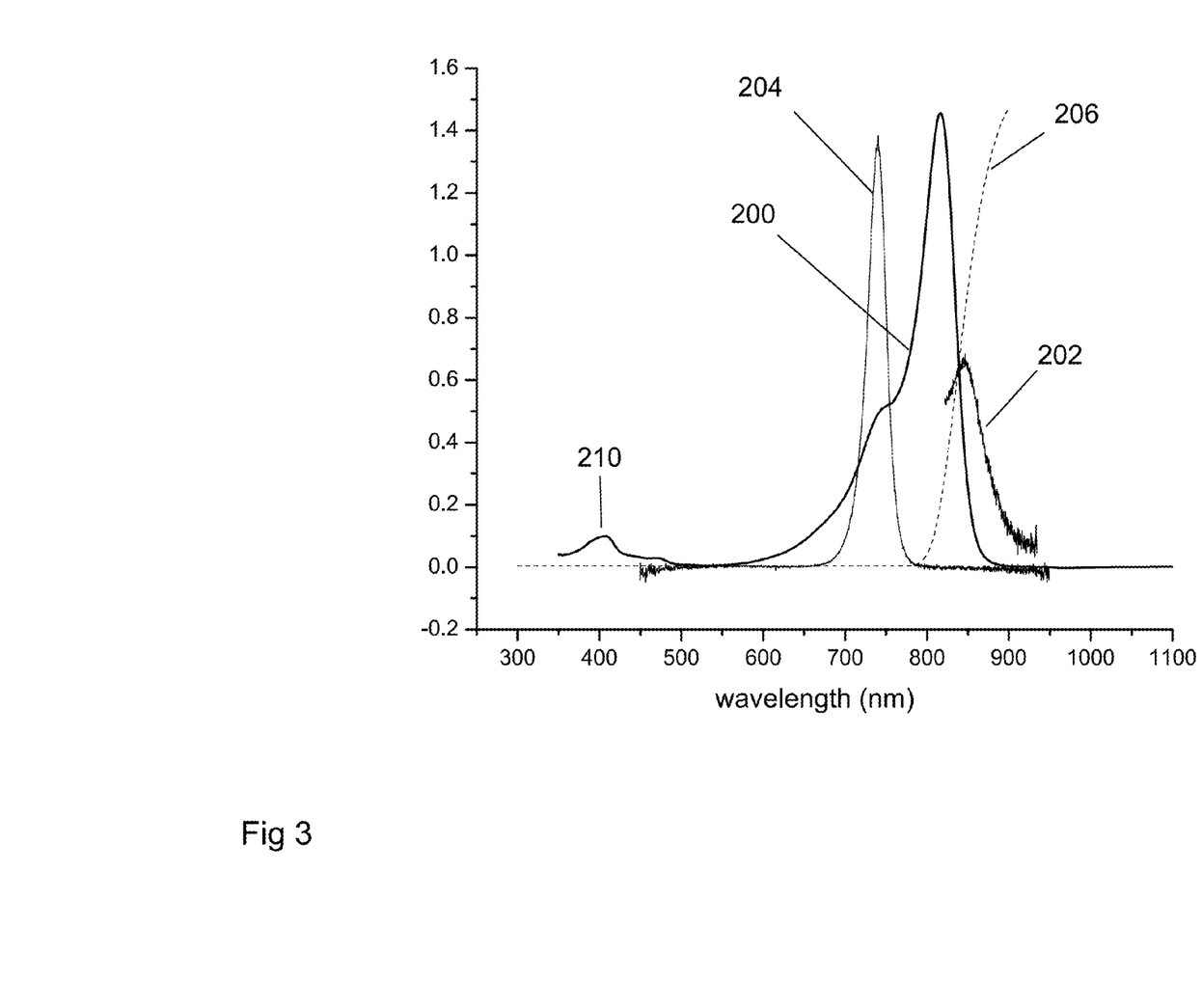
FIG. 3 is a plot of optical spectra of dye, light source, and filter.

Suitable invisible inks for this invention are based on organic infrared dyes such as cyanines or phthalocyanines. FIG. 3 shows optical spectra of the dye absorption 200 and emission 202 of a prototypical dye, as well as the emission 204 of the light source 102, and the transmission curve 206 of the filter 106. Because of the large spectral overlap of the dye absorption and emission it is not possible to excite the dye in its absorption maximum while simultaneously capturing all of the dye emission. In order to block all of the excitation light from reaching the array sensor it is often necessary to excite the dye in the shoulder of the absorption at shorter wavelengths as well as to cut off some of the short wavelength component of the dye emission. This disadvantage can be overcome by exciting the fluorescent dye in the higher S2 excitation band instead of the lowest S1 excitation band. For the dye in FIG. 2 the S2 excitation band 210 is centered around 400 nm. Because of the large separation of dye excitation (400 nm) and dye emission (850 nm) one can easily design a filter that blocks all of the excitation light while transmitting all of the dye emission. For example, a long pass filter with a threshold wavelength of 700 nm could be chosen.

Figure 4:
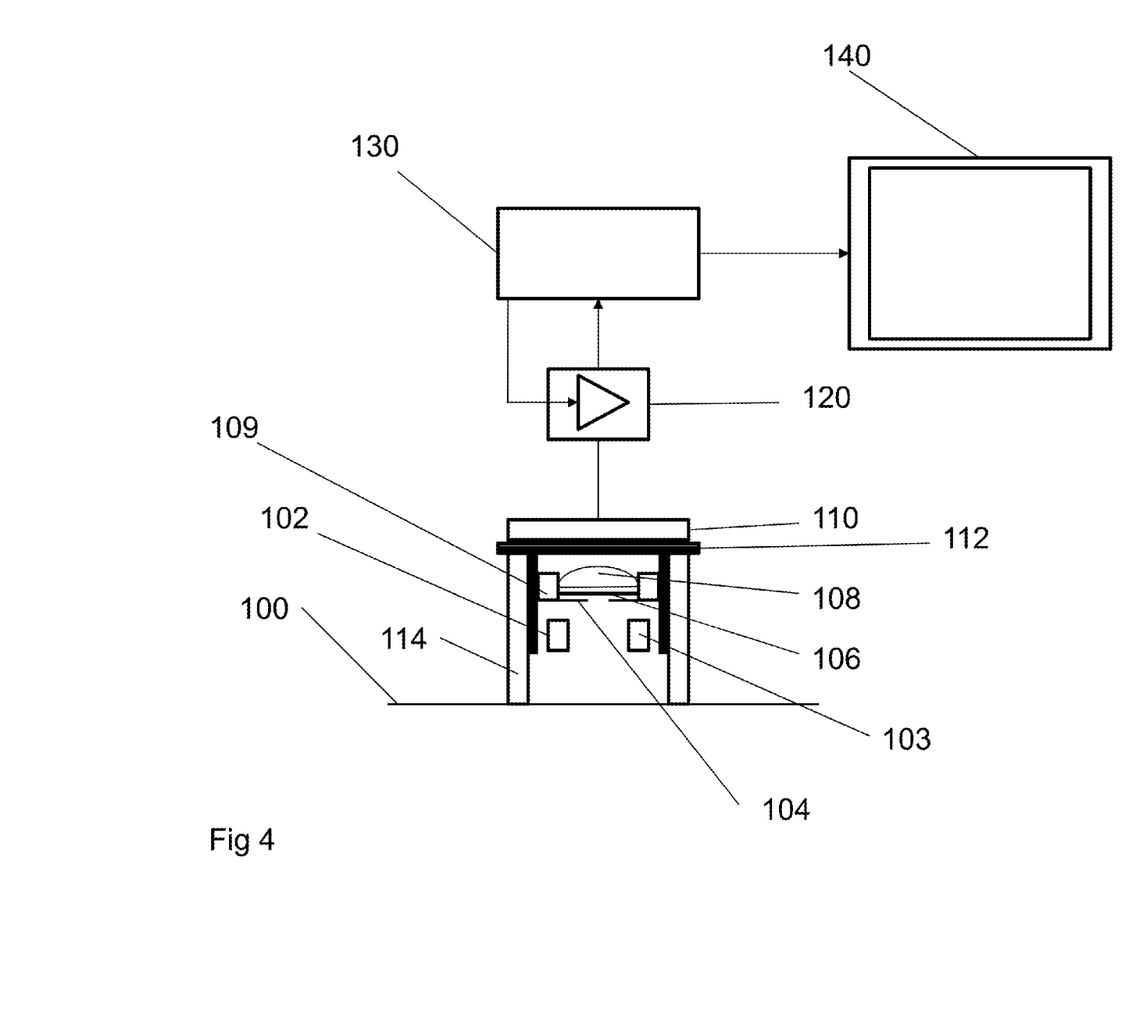
FIG. 4 is a schematic view of the components of a variant of the viewer with light sources of different wavelengths.

FIG. 4 shows a variant of the device in FIG. 1 wherein the light sources 102 and 103 emit light at the wavelengths $\lambda_{ex}1$ and $\lambda_{ex}2$, respectively. They can be independently turned on. $\lambda_{ex}1$ is chosen to overlap with the absorption band of one of the dyes making up the infrared ink. The light of light source 102 is blocked by the emission filter 106. $\lambda_{ex}2$ is chosen to overlap with the absorption band of a second dye. This light passes the emission filter. By alternating the light sources 102 and 103 the image can be switched from a fluorescence image of the first dye to a reflectance image of the second dye. When light source 102 is turned on and light source 103 is turned off, the dye image of the first dye is visible in the display as bright spots on a dark background. When light source 103 is turned on and light source 102 is turned off, the image of dye 2 is visible as dark features on a bright background. The ability of the device to visualize two invisible inks independently enables more complex security features on the printed media that are even harder to counterfeit.

Figure 5A:
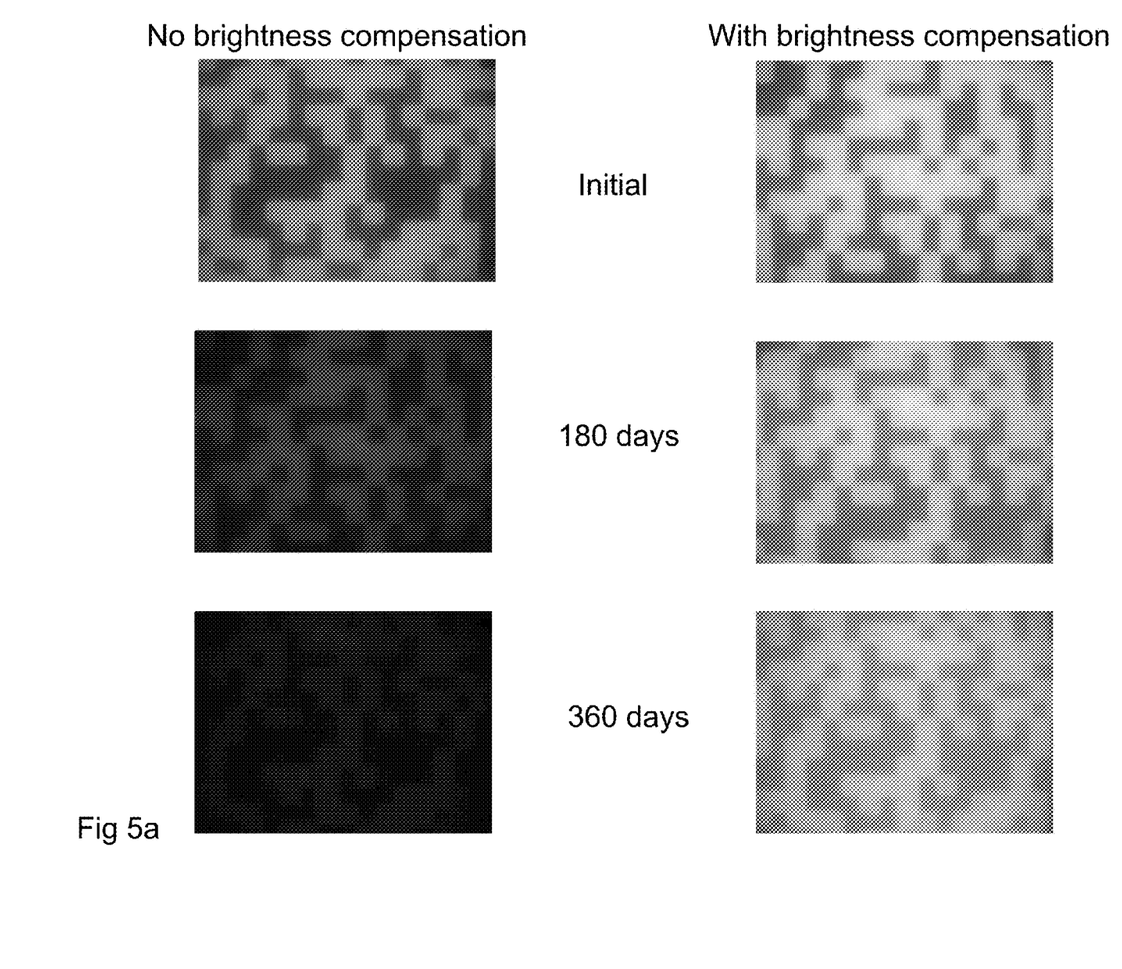
FIGS. 5A-5C show images of light-faded samples imaged with and without brightness compensation.
Figure 5B:
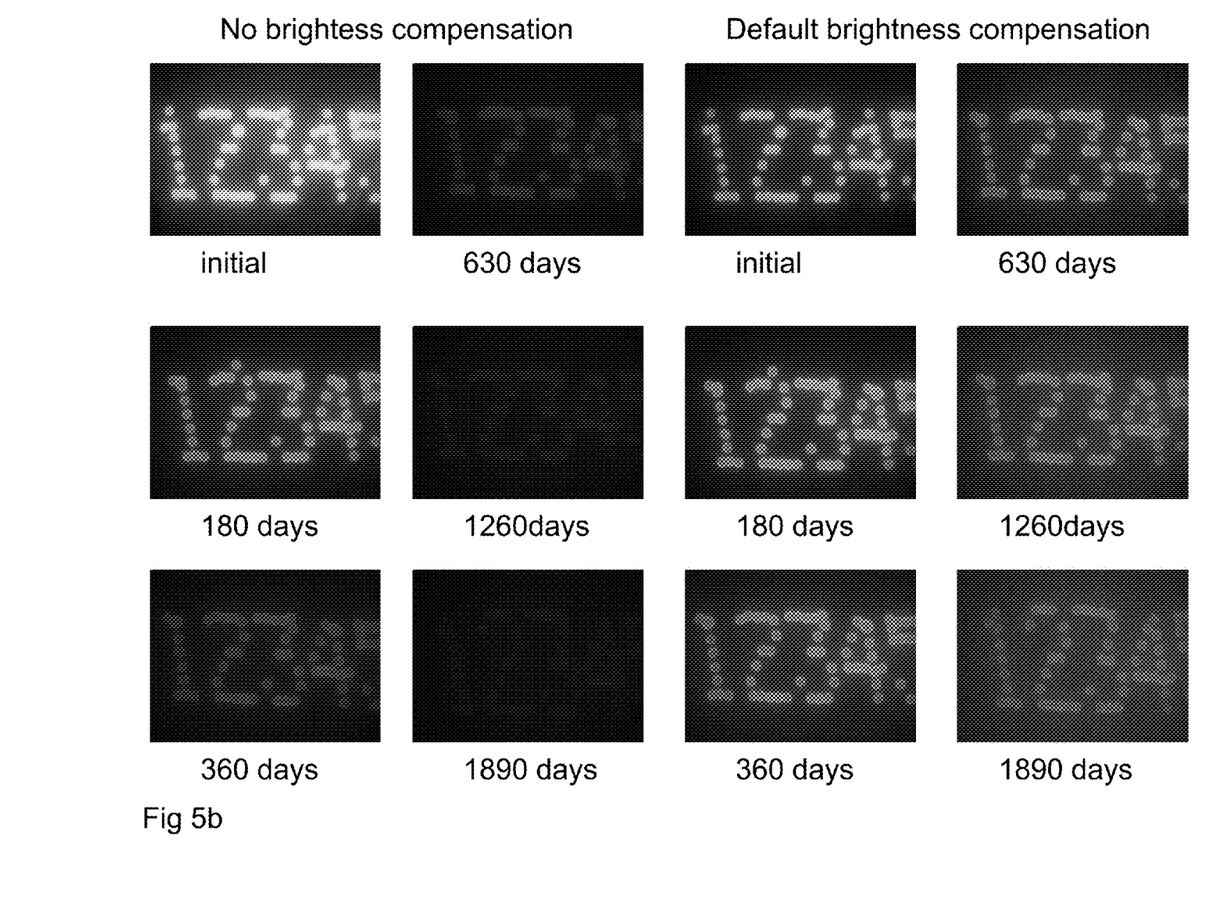
Figure 5C:
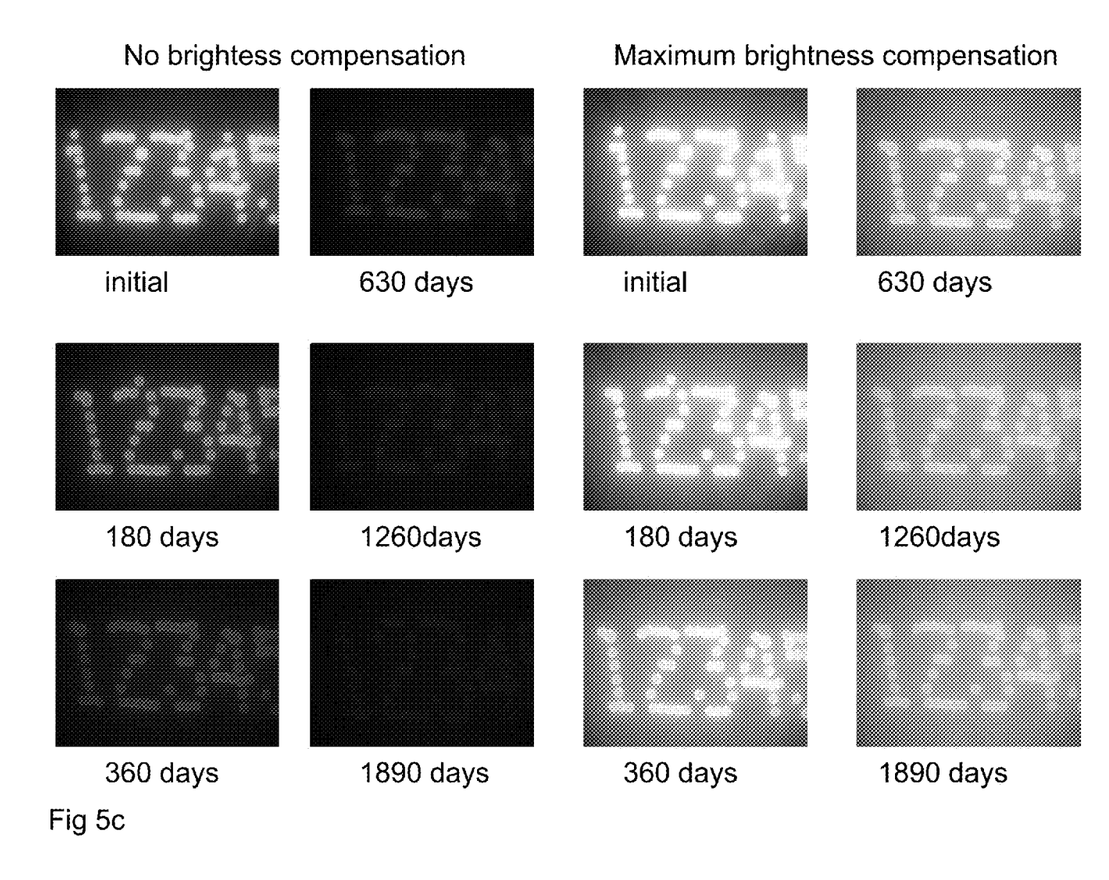

FIGS. 5A-5C show comparative examples of images of media printed with an invisible ink that were subject to accelerated light fade under conditions of 5.4 Klux daylight equivalent illumination. Under these conditions an exposure of 24 hours corresponds to an average exposure of 90 days under average room light conditions. The room light equivalent fade number is given underneath each image. The six images in the left half of the figure were imaged with a viewer without brightness compensation whereas the six images in the right half of the figure were imaged with a viewer that incorporates brightness compensation. Clearly, the brightness compensation affords much better readability of light faded samples.

The invention has been described in detail with particular reference to certain preferred embodiments thereof, but it will be understood that variations and modifications can be effected within the scope of the invention.

PARTS LIST 100 surface of the marked media
101 printed indicia
102 light sources
104 aperture
106 filter
108 focusing lens
109 lens holder
110 array sensor
112 focusing ring
114 cylindrical baffle/spacer
120 amplifier
130 microcontroller
140 display
150 viewer housing
152 feet
200 dye absorption
202 dye emission
204 light source emission
206 transmission curve of filter
210 S2 excitation band of dye

The invention claimed is:

1. A method for detecting and viewing invisible indicia comprising:
   illuminating the invisible indicia with radiation of a first wavelength with an illumination source;
   detecting emitted light from the invisible indicia at a second wavelength with a sensor array;
   eliminating reflected radiation at the first wavelength;
   focusing an image of the invisible indicia on the sensor array;
   displaying the image of the invisible indicia;
   spacing the sensor array at a fixed distance from the invisible indicia with a spacer, wherein the spacer surrounds the lens and illumination source and the spacer blocks ambient light; and
   adjusting sensitivity of the sensor array.

2. The method of claim 1 wherein the spacer is opaque.

3. The method of claim 1 wherein the illumination source emits radiation in the infrared band.

4. The method of claim 3 wherein the sensor detects radiation in the infrared band.

5. The method of claim 1 wherein the illumination source emits radiation in the blue or ultraviolet band.

6. The method of claim 5 wherein the sensor detects radiation in the infrared band.

7. The method of claim 1 wherein the indicia is human readable by the apparatus.

8. A method for detecting and viewing and invisible indicia comprising:
   illuminating the invisible indicia with radiation of alternating between a first and second wavelength with an illumination array;
   detecting emitted light from the invisible indicia at least a third wavelength with a sensor array;
   eliminating reflected radiation at the first wavelength;
   focusing an image of the invisible indicia on the sensor array;
   displaying the image of the invisible indicia;
   spacing the sensor array at a fixed distance from the invisible indicia; and
   adjusting sensitivity of the sensor array.

9. The method of claim 8 wherein illumination with the first wavelength generates a florescence image of the invisible indicia and illumination with the second wavelength generates a reflected image of the invisible indicia.

10. The method as in claim 8 wherein a filter between the sensor and the invisible indicia eliminates reflected radiation.

11. A method for detecting and viewing invisible indicia comprising:
    illuminating the invisible indicia with blue or ultra-violet radiation;
    detecting emitted infra-red light from the invisible indicia with a sensor array;
    eliminating reflected blue or ultra-violet radiation;
    focusing an infra-red image of the invisible indicia on the sensor array;
    displaying the infra-red image of the invisible indicia; and
    adjusting sensitivity of the sensor array.

12. The method of claim 11 further including spacing the sensor array at a fixed distance from the invisible indicia with a spacer, wherein the spacer surrounds the lens and illumination source and the spacer blocks ambient light.

13. The method of claim 11 wherein the spacer includes an inner white surface that diffuses the emitted radiation of the illumination source.

14. The method of claim 1 wherein the spacer includes an inner white surface that diffuses the emitted radiation of the illumination source.

* * * * *